US006983958B2

(12) United States Patent
Rautureau (10) Patent No.: US 6,983,958 B2
(45) Date of Patent: Jan. 10, 2006

(54) SUPPLY CONNECTION DEVICE FOR A FLUID PRESSURE SYSTEM

(75) Inventor: Stéphane Rautureau, Suresnes (FR)

(73) Assignee: Valeo Embrayages, Amiens Cedex (FR)

( * ) Notice: Subject to any disclaimer, the term of this patent is extended or adjusted under 35 U.S.C. 154(b) by 0 days.

(21) Appl. No.: 10/240,675

(22) PCT Filed: Feb. 5, 2002

(86) PCT No.: PCT/FR02/00425

§ 371 (c)(1),
(2), (4) Date: Oct. 3, 2002

(87) PCT Pub. No.: WO02/063202

PCT Pub. Date: Aug. 15, 2002

(65) Prior Publication Data

US 2003/0052484 A1    Mar. 20, 2003

(30) Foreign Application Priority Data

Feb. 5, 2001    (FR) .................................. 01 01532

(51) Int. Cl.
*F16L 37/00*    (2006.01)
(52) U.S. Cl. ...................................... 285/305; 285/321
(58) Field of Classification Search ................ 285/305, 285/308, 319, 321, 921
See application file for complete search history.

(56) References Cited

U.S. PATENT DOCUMENTS

| 2,021,241 | A | * | 11/1935 | Mall .......................... 285/308 |
| 3,314,696 | A | * | 4/1967 | Ferguson et al. ........... 285/321 |
| 3,753,582 | A | * | 8/1973 | Graham ...................... 285/305 |
| 4,111,197 | A | * | 9/1978 | Warncke et al. ....... 128/202.27 |
| 4,725,081 | A | * | 2/1988 | Bauer ......................... 285/305 |
| 4,811,975 | A | | 3/1989 | Paul, Jr. et al. |
| 4,874,174 | A | * | 10/1989 | Kojima et al. .............. 285/305 |
| 4,884,829 | A | * | 12/1989 | Funk et al. ................. 285/321 |
| 5,964,483 | A | | 10/1999 | Long et al. |

FOREIGN PATENT DOCUMENTS

| DE | 199 60 431 C1 | | 11/2000 |
| EP | 0 468 629 A2 | | 1/1992 |
| FR | 2 736 136 | | 1/1997 |
| GB | 2302926 A | * | 2/1997 |
| JP | A-4-92185 | | 3/1992 |
| JP | A-7-260073 | | 10/1995 |
| JP | A-8-219352 | | 8/1996 |

* cited by examiner

*Primary Examiner*—Aaron Dunwoody
(74) *Attorney, Agent, or Firm*—Berenato, White & Stavish LLC (57) ABSTRACT

A supply connection device for a fluid pressure system, the connection includes a head designed to be axially received in a body of a supply intake, and the connection is capable of being locked in a front position axially engaged in the supply intake body by a locking mechanism, which includes a globally symmetrical U-shaped pin with two transverse locking branches. The connection is unlocked from the body, for axially releasing, at least partly, rearward the connection outside the body, by elastic deformation of the locking mechanism which results from the co-operation between at least a part of the locking branches and at least a part of the body under the action of a releasing force exerted on the locking mechanism along a transverse direction. The elastic deformation is obtained by exerting a releasing force thrusting a connecting section of the two braches of the pin.

11 Claims, 6 Drawing Sheets

SUPPLY CONNECTION DEVICE FOR A FLUID PRESSURE SYSTEM

BACKGROUND OF THE INVENTION

1. Field of the Invention

This invention relates to a device for connecting the feed for a fluid pressure system.

More particularly, the invention relates to a device for connecting the feed for a pressure fluid system, of the type in which a connector comprises a head adapted to be received axially in a body of a feed inlet, and of the type in which the connector is adapted to be locked in position before being engaged axially in the feed inlet body by locking means.

2. Description of the Related Art

It is known to make use of connectors of this type, also referred to as plug-in connectors, in order to make the connection in a feed pipe on the inlet of a hydraulic member in a simple and inexpensive way.

Such a coupling device for a feed of a fluid pressure system is for example known from the document FR-A-2 736 136.

That document describes more particularly a device of the type in which a connector is adapted to be held in its engaged position, axially within the feed inlet of a receiver member, by retaining means, and in which there are arranged, firstly a purge orifice of the receiver member and secondly a sealing ring disposed between the head of the connector and the feed inlet, the connector sealingly obturating the purge orifice in the engaged position, which is also called the locking position, and being able to occupy a position called the purge position, in which it is partly retracted axially towards the rear and in which it is held by retaining means, the feed inlet being put into communication sealingly with the purge orifice.

It is known from the said document to provide retaining means which consist of a clip or hairpin with two branches constituting a U, which is engaged transversely in the feed inlet body in such a way as to cooperate with a radial annular groove formed in the outer cylindrical surface of the connector.

More precisely, each branch of the clip comprises a cylindrical first portion and a cylindrical second portion of larger diameter, the cylindrical first portion co-operating with either a first or rear groove or a second or front groove, these grooves being formed in the connector for retaining it in the locking and purge positions respectively.

The second portion, having the larger diameter, enables passage from the locking position to the purge position to be achieved. More precisely, operation of the device will be explained below.

First, in order to put the device in its operating state, that is to say in its locked position, the operator has to proceed successively in the following way:

the connector is introduced into the body until it reaches its most advanced front axial position, and the clip is then engaged transversely in the body until the first cylindrical portion of the clip positions itself in the annular first or rear groove of the connector.

It is not easy for the operator to connect the device in its locking position, because it is necessary that the first or rear groove shall be in axial coincidence with the locking means.

Subsequently, when the operator wants to put the device in its purge position, he has successively to carry out the following:

first, to exert a first pulling force on the clip in order to cause it to be partly withdrawn out of the body in a straight-line movement, until the second cylindrical portion having the larger diameter is positioned in axial coincidence with the connector, so as to permit axial separation towards the rear, and second, to withdraw the connector axially towards the rear.

The locking means are then in an unlocked position. As will be understood, the axial rearward separation of the connector in order to pass from the locking position to the purge position is only possible if the cylindrical second portion having the larger diameter is correctly positioned, that is to say it is in perfect axial coincidence with the connector. Now since there is no way that the operator can control this good positioning by eye, it is necessary to proceed by trial and error, which is not satisfactory for various reasons.

Among these reasons may be mentioned the time which can be necessary for the operator to position the connector in its purge position, and this is incompatible with production requirements, particularly in the case where these assembly operations are carried out on production lines for motor vehicles in which each operation is scrupulously timed.

These problems do of course occur as much for an operator during the first time the operation is carried out as later on during maintenance operations on the vehicle.

However, the operations just described are only the first set of steps to be effected by the operator before the purge can actually be used. In this connection, when the operator has reached the correct position of the cylindrical second portion, and has therefore axially disengaged the connector towards the rear, he still cannot carry out the purge because he must first absolutely carry out a second set of operations.

This second set of operations consists in particular in the operator re-engaging the clip transversely so as to ensure retention of the connector, that is to say he must reposition the first cylindrical portion in the front groove corresponding to the purge position. Now here again, this operation is only possible if the connector, and therefore the front groove, is correctly positioned with respect to the clip.

Apart from the fact that the second set of operations on the device has the same disadvantages as before, it gives rise above all to an additional safety problem.

A purge operation is necessary to expel any gas such as air which has been able to enter the device, and more particularly into a hydraulic member such as a receiver, thereby guaranteeing proper subsequent operation of the device.

To this end, the operator carries out the purge of the system, that is to say he causes fluid to flow under pressure within the hydraulic member, for example by reducing the pressure. However, it is absolutely necessary that he has first re-engaged the clip in such a way that the cylindrical first portion is correctly positioned. In default of this, retention of the connector is not guaranteed, and under the action of the fluid pressure, there is a danger of the connector being expelled violently out of the feed inlet body.

The document DE-A-199.60.431 describes locking means between a first member and a second member which is attached on the first.

These means consist of a U-shaped hairpin member, generally cylindrical and also comprising a gripping portion formed in a connecting portion between the two branches of the hairpin. The branches include locking portions and stop fingers at the free end of each branch which cooperate with ramps forming part of the first member.

The hairpin is mounted in a slot in a supplementary intermediate member which is clipped axially on the first member.

In order to be able to proceed with assembly or disassembly, it is necessary to put the hairpin in an unlocking position whereby to be able to introduce or withdraw the two members axially.

To this end, it is necessary to exert on the gripping or connecting portion a transverse pulling force radially outwards, the effect of which, in conjunction with the mating cooperation of the stop fingers of each of the branches with the ramps of the first member, is to cause the branches to move apart in a radially outward direction, so that the locking portions are no longer in contact with the second member. This displacement of the stop fingers on the ramps is limited by safety notches against which the fingers come into abutment, and it is therefore impossible for the finger to be removed accidentally while the pulling release force is being exerted on the latter. Once this traction force ceases to be exerted, the hairpin regains its initial locking position due to the elasticity of its branches.

The features disclosed in the said document may be seen as lying principally in the use of the elastic deformation of the locking branches by mating cooperation with the ramps.

However, the initial fitting of the hairpin necessitates an additional intermediate member and can only be carried out in an axial, and not a radial, direction.

In addition, the force exerted on the connecting portion between the two branches of the hairpin, for the purpose of unlocking it, is a tractive force which is not natural for an operator, and which is in particular difficult to maintain during the unlocking operation.

SUMMARY OF THE INVENTION

An object of the present invention is to propose a feed connection device of the type mentioned above, which in particular overcomes the drawbacks just described.

Preferably, the locking device for the locking means is repositioned for elastic deformation in the locking position once the operator ceases to exert a releasing force on the locking means, so that the device is more reliable.

According to the invention, the releasing force is a small pushing force, such as thumb pressure by the operator, which must be applied on a connecting portion of the locking means to cause the elastic deformation to take place. By applying a pushing force, the operator is under ergonomic working conditions without any risk of accidental disconnection, and it is no longer necessary to provide means similar to the safety notches in the document DE-A-19603506. Another result is simple mounting of the hairpin similar to that which was known from FR-A-2 736 136, in the field of hydraulic coupling devices.

Preferably, the friction effects of the locking means on the body take place on external surfaces of the body, so that no damage to the working surfaces of the body is likely over time due to repeated manoeuvres of the locking means, and thus for example the internal bore which participates in the guiding and sealing functions is preserved.

Further features of the invention are defined by the secondary Claims.

The invention also proposes a device of the type in which the feed inlet body includes a purge orifice, and of the type in which at least one sealing ring is arranged between the head of the connector and the feed inlet, characterised in that in the engaged position, the connector sealingly obturates the purge orifice, and in that the connector is able to occupy a position in which it is partly retracted axially towards the rear, wherein the feed inlet is put into sealed communication with the purge orifice.

BRIEF DESCRIPTION OF THE DRAWINGS

Further features and advantages of the invention will appear on a reading of the following detailed description, for an understanding of which reference will be made to the attached drawings, in which.

DETAILED DESCRIPTION OF PREFERRED EMBODIMENTS

In the following description, in order to assist understanding, we will use, without limitation, the expressions vertical, horizontal, front, rear, left, right etc. with reference to the drawings and in accordance with the definitions given in the description.

In the description, those elements which are identical, similar or analogous to each other will be designated by the same reference signs.

The device 10, for connecting a feed line for a pressure fluid system, which is shown in FIGS. 1 to 5, consists essentially of a front body 11 of a feed inlet 12, which in this example is substantially tubular with an axis X, and which is able to be fixed with respect to a hydraulic member such as a receiver (not shown), together with a rear connector 30 which is arranged to be fixed to the end of a feed pipe (not shown).

We choose to describe here the device 10 in the case where the connector 30 is considered to be movable with respect to the feed inlet 12, but, without departing from the scope of the invention, the structures could of course be reversed to achieve a device 10 in which, firstly, the connector 30 is fixed and secondly, the body 11 of the feed inlet 12 is connected to the end of a pipe such as a flexible or semi-rigid pipe, in such a way that this pipe is then indirectly connected to the hydraulic member.

Figure 1:
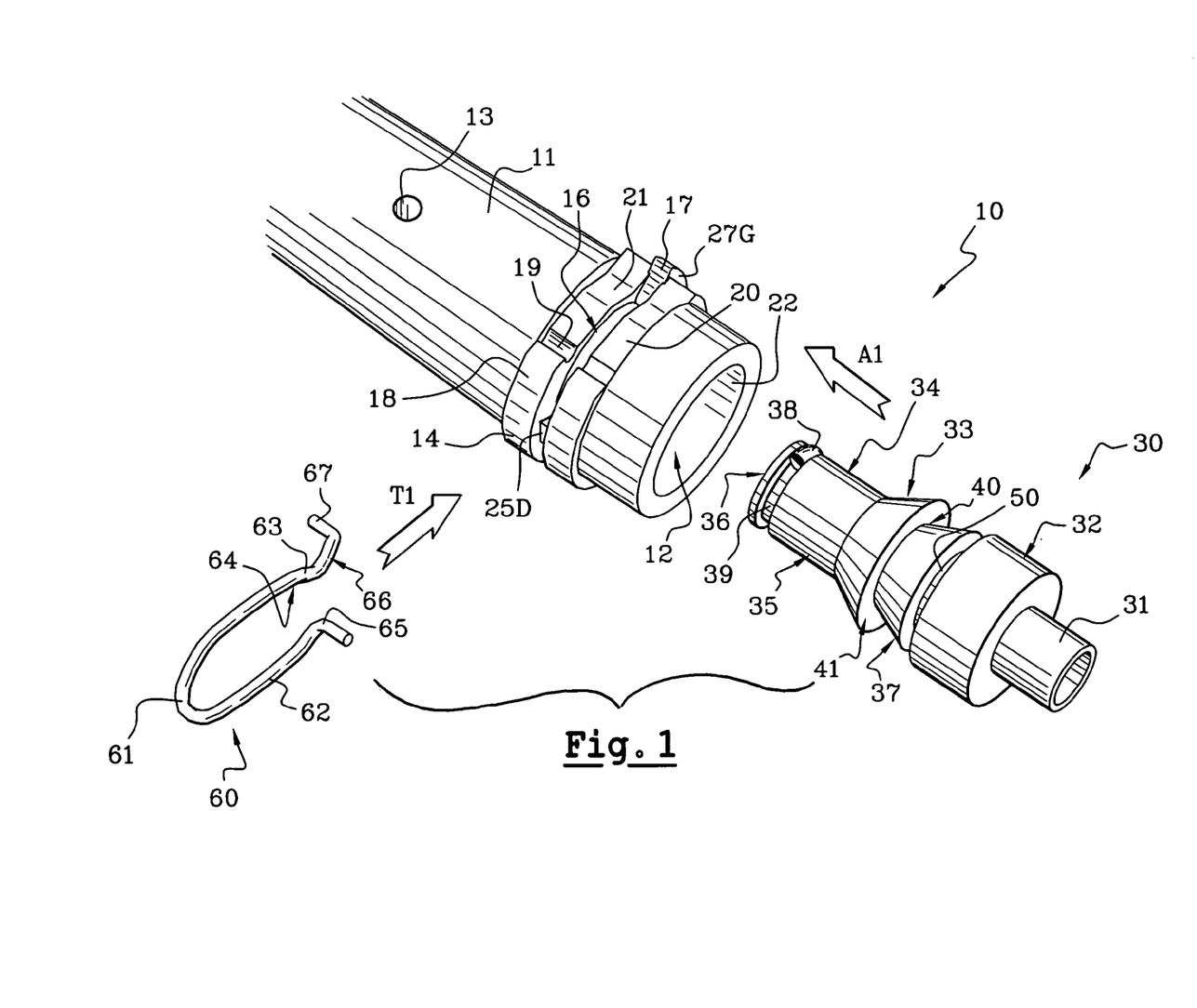
FIG. 1 is an exploded perspective view of the three main components of a device in a first embodiment according to the features of the invention.

FIG. 1 is an exploded perspective view of a device for connecting the feed for a pressure fluid system according to the invention, and more precisely shows its three main components, that is to say a device 10 of the type in which a rear connector 30 has at the front a head 35 adapted to be received axially in a front body 11 of a feed inlet 12, and of the type in which the connector 30 is adapted to be locked in position, before being engaged axially in the body 11, by locking means 60, each of these components 11, 30, 60 being described in greater detail later herein.

The feed inlet body 11 in this example is fixed at its front end to a hydraulic receiver (not shown), and consists essentially, considered axially from front to rear, of a purge orifice 13, an active part designed to receive and cooperate with the locking means 60, and a feed inlet 12 at its free rear end.

The purge orifice 13 in this example is made in the form of a purge hole which is pierced radially into the body 11 and is open inside the body within the feed inlet 12, thereby putting the feed inlet into communication with the outside of the body 11.

Figure 2A:
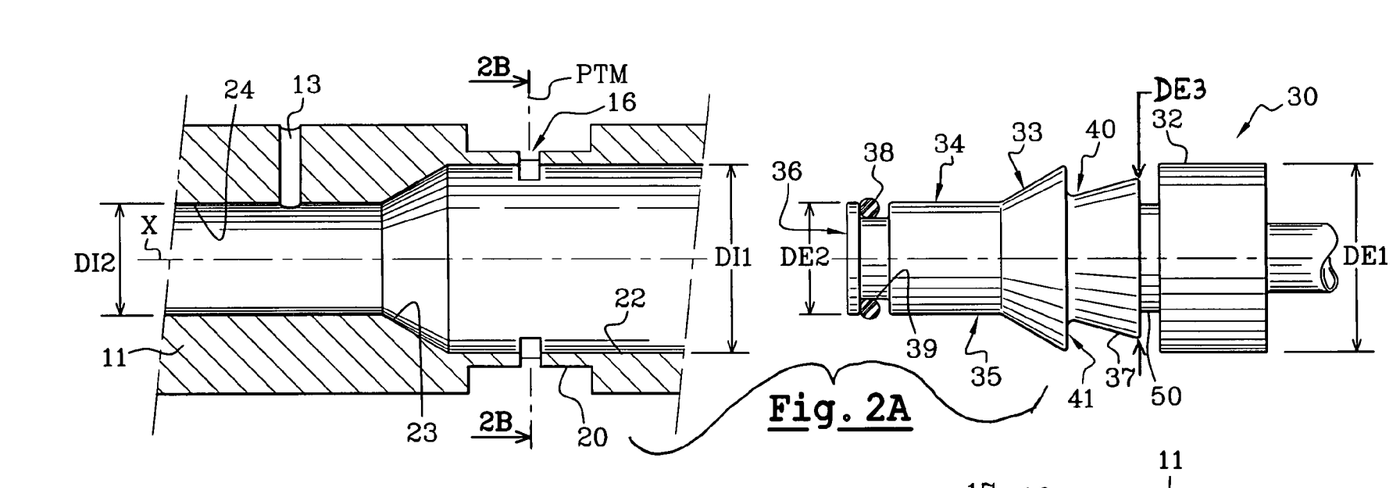
FIGS. 2A, 2B and 2C are, respectively, a view in axial cross section, a view taken in transverse cross section on the line 2B—2B of FIG. 2A, and a perspective view, of a device in the first embodiment of the invention in which the head of the connector is shown out of the body, that is to say in position ready to be moved forward to make the connection, or again, in the position resulting from disconnection of the connector and body, obtained by exerting, among other things, a releasing force on a locking means.
Figure 2B:
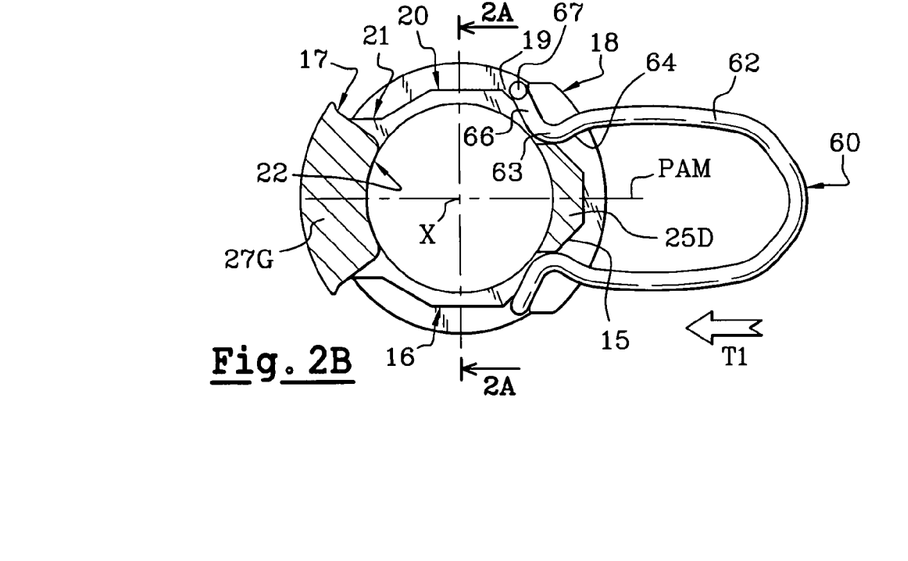

The assembly of the body 11, except for the purge orifice 13, defines a first symmetry with respect to a median transverse plane PTM which can be seen in FIG. 2A, together with a second symmetry with respect to a median axial plane PAM which can be seen in FIG. 2B.

The active part of the body 11 consists essentially of a transverse groove 16 which is delimited axially and symmetrically about the plane PTM by two sleeves 14.

The internal profile of the body 11 is thus symmetrical about the median axial plane PAM as shown in FIG. 2A. The internal profile of the body 11 is a stepped profile of revolution complementary to that of the connector 30, which comprises, in succession from back to front, a first cylindrical portion 22, a frusto-conical intermediate portion 23, and a second cylindrical portion 24.

The first portion 22, which has a large internal diameter DI1, extends on either side of the transverse groove 16, while the second portion 24, which has a small internal diameter DI2, extends on either side of the purge hole 13, the first portion 22 being joined to the second portion 24 through the frusto-conical portion 23.

The body 11 thus comprises, axially behind the purge hole 13, a transverse groove 16 which extends over the major part of the circumference of the body 11, having a profile generally complementary to the locking means 60 which can be introduced into it in the transverse direction T1.

The transverse groove 16 is symmetrical with respect to the horizontal plane PAM, as is shown in FIG. 2B. More precisely, the transverse groove 16 extends into the thickness of the body 11 in its radially outer and inner parts, so that the groove 16 is open on the outside and is open into the interior of the body 11, that is to say into the feed inlet 12.

The part complementary with the groove 16, that is to say the complementary residual material of the body 11, constitutes first and second portions 27G and 25D, formed respectively on the left and right side faces of the body as is best seen in FIG. 2B.

The first or right hand side portion 25D is delimited firstly, radially inwards, by the bore 22 of the feed inlet 12, and radially outwards by a tangentially oriented flat face, and secondly, symmetrically with respect to the plane PAM, by a pair of inclined ramps 15 or opening ramps, which are inclined towards the right.

In the same way, the left-hand second side portion 27G comprises a pair of inclined ramps 17, referred to as main control ramps.

The two sleeves 14, which are symmetrical about the median transverse plane PTM of the groove 16, have in this example a diameter which is substantially greater than that of the body 11, so that the sleeves 14 project outwards, at least over part of their circumference.

The outer lateral face of each sleeve 14 includes a succession of cam tracks and notches arranged for cooperation with the locking means 60.

Figure 2C:
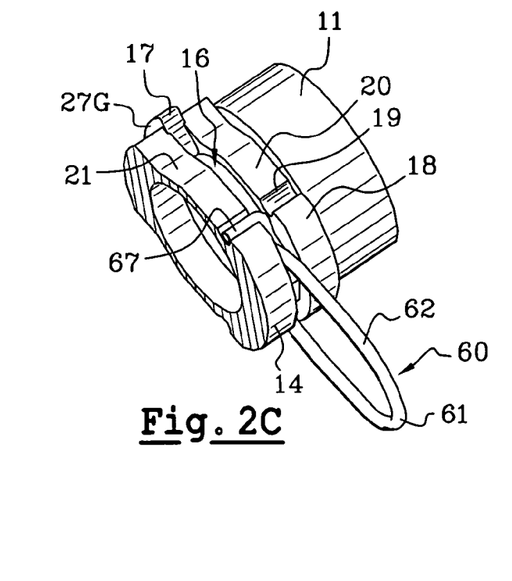

The upper part or lower part of the outer lateral face of each sleeve 14 thus includes, considered from right to left, and as can be seen in particular in FIGS. 2B and 2C, a cam track which is symmetrical with respect to the plane PAM and includes an actuating cam 18, a notch 19 followed by a generally flat surface 20, and a run-off zone 21.

It will be noted that the distance of the flat 20 of the sleeve 14 with respect to the axis X, is in this case slightly smaller than that of the body 11, as also is that of the run-off zone 21 with respect to the flat 20.

The locking means 60 in this example consist of a bent spring wire which is elastically deformable. More particularly, the means consist of a generally U-shaped hairpin 60 which is oriented horizontally with respect to the drawings.

As can be seen in FIG. 1, the hairpin spring 60 has two substantially parallel and rectilinear transverse branches 62, orthogonal to the axis X and lying substantially in the transverse plane PTM, to be symmetrical with respect to the axial plane PAM, these branches being joined together by a connecting portion 61 such as a semi-annular 180° portion which offers a central or median handling portion oriented generally in a direction at right angles to the branches 62.

Each branch 62 of the hairpin locking spring 60 has a particular profile which is adapted to cooperate, firstly with the body 11, and secondly with the connector 30, in order to perform different functions.

The profile of each branch 62 thus includes, going from the middle of the branch towards its left hand free end in FIG. 2B, a first portion 64, a first bend 63, a second portion 66, a second bend 65, and finally a finger 67.

The first portion 64 is curved, in this example radially inwards, so as to define a locking portion 64, while the first bend 63 defines a point of inflection in the profile which is extended by a second portion 66 which is referred to as the control portion 66.

The finger 67 lies in a plane generally at right angles to the transverse plane PTM, asymmetrically in this case, that is to say one of the fingers 67 of the branches 62 extends forward and the other one towards the rear, being the upper and lower fingers respectively.

The connector 30 consists essentially, at the front, of a head 35 which is arranged to be received axially in the body 11 of the feed inlet, and at the rear it comprises a tail or connecting nozzle 31 for connecting it to a feed pipe.

The connector 30 in this example is substantially tubular and has an internal duct 36 which is open at the front axial end of the connector, and through which fluid can flow under pressure from the feed inlet 12 towards the pipe, or vice versa.

The head 35 of the connector 30 has a stepped profile complementary to the internal profile of the body 11 of the feed inlet 12 (which has already been described), and more precisely the head 35 includes, considered in succession from back to front, a first or rear cylindrical portion 32, a first frusto-conical portion 37 constituting a ramp, a frusto-conical second portion 33, and a second cylindrical portion 34.

The first and second cylindrical portions 32, 34 are cylindrical portions which participate in the guiding of the head 35 of the connector 30, respectively into the first portion 22 and second portion 24 of the body 11, the first portion 32 having an outer diameter DE1 greater than the outer diameter DE2 of the second portion 34.

In the same way, the frusto-conical second portion 33 has a complementary form to that of the frusto-conical portion 23 of the profile of the body 11 that joins the first portion 22 to the second portion 24.

An internal radial groove 39 is formed in the second portion 34 at the front end of the head 35, and in it there is lodged a sealing ring 38 which co-operates with the second portion 24 of the body 11 of the feed inlet 12, as can be seen best in the axial cross section of FIG. 2A.

The connection between the two frusto-conical portions 33, 37 defines a radial rear shoulder 41 and a groove 40 with a V-shaped profile. Finally, the junction zone between the frusto-conical first portion 37 and the cylindrical rear portion 32 comprises a radial internal locking groove 50.

The frusto-conical second portion 33 has a maximum outside diameter which is generally equal to the corresponding diameter DE1 of the rear cylindrical portion 32, and the first frusto-conical portion 37 has an outside diameter DE3 which is smaller than the diameter DE2 by an amount sufficient to enable the branch 62 of the hairpin spring 60 to pass during the unlocking operation, in particular in order to manoeuvre the connector head 35 from the locking position to the purge position, as will be explained in detail later herein.

As will have been understood, the value of the diameter DE3 is therefore a function of the locking means 60, in particular, here, of the diameter of the wire of which the hairpin spring 60 is made.

Operation of the device 10 for connecting the feed, and of its components 11, 30, 60 will now be explained with reference to FIGS. 2 to 4.

FIG. 2A shows an axial cross section of the connector 30 outside the body 11 as in FIG. 1.

The connector 30 is accordingly in a position that corresponds either to a position in which it is ready to be engaged forward in the direction A1 into the body 11 of the feed inlet 12, or in a position that results from its total removal out of the body 11 after unlocking.

Prior to the engagement of the head 35 of the connector 30 in the feed inlet of the body 11, the hairpin spring 60 may or may not be mounted on the body 11 in a first position or so-called unlocking position, as shown in FIGS. 2B and 2C.

Figure 3A:
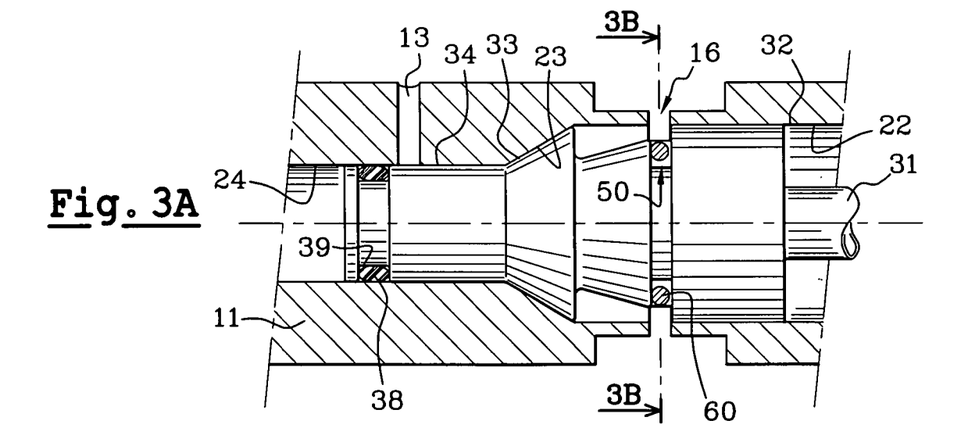
FIGS. 3A, 3B and 3C are views similar to FIGS. 2A and 2C, showing the device in a first or so-called locking or working position, in which the head of the connector is engaged in the body and retained by the locking means.
Figure 3B:
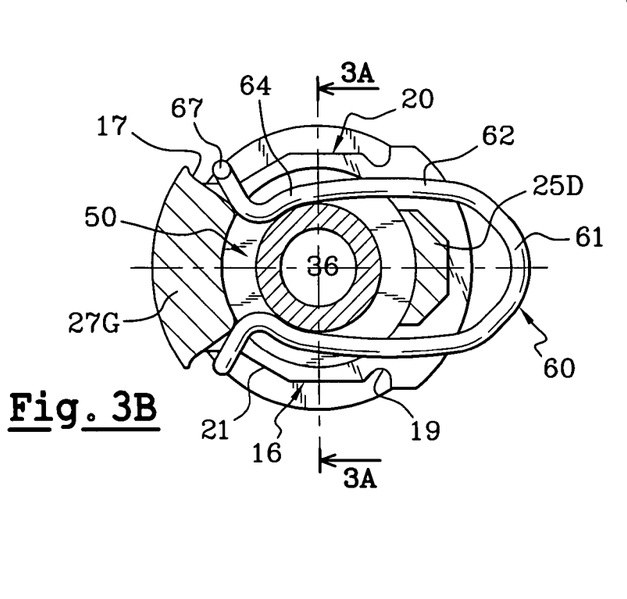

However, the hairpin spring 60 may with advantage be pre-fitted in its locking position as shown in FIG. 3B, the connector 30 being then force-fitted into the body 11. This force-fitting is made possible because of the elastic deformation of the branches 62 of the hairpin spring, which will deform successively under the action of the frusto-conical portions 33, 37 until they are positioned in the groove 50.

Preferably, such a force-fitting produces, during the passage of each frusto-conical portion, a click sound which can enable the operator to exercise additional auditory control, so that the device is a device of the "double click" type.

In order to fit the hairpin spring 60 in this first or unlocking position, the hairpin spring 60 has to be engaged transversely on the body 11 in the direction T1. More particularly, the branches 62 must be engaged in facing relationship with the transverse groove 16. During this engagement, the hairpin being in facing relationship with the groove 16, the fingers 67 at the ends of the branches 62 then come into contact with the actuating ramps 18 of the sleeves 14, and the branches 62 themselves come into contact with the actuating ramps 15, the effect of all this being that the assembly, by mating cooperation, separates the branches 62 from each other so that they then deform elastically radially outwards.

If the engagement operation is continued, the fingers 67 follow the surface defined by the actuating ramps 15, until they are positioned automatically in the first notches 19 because of the resilient return force exerted by the branches 62.

The hairpin spring 60 is then in its unlocked position, that is to say it is held on the body 11 in such a way that it cannot be lost. The hairpin spring 60 is accordingly immobilised, firstly transversely by the fingers 67 in the first notches 19, and secondly, axially at the level of the first bend 63 by each of the front and rear side faces of the groove 16 defined between the sleeves 14, as illustrated by FIGS. 2B and 2C.

With the hairpin spring 60 in its unlocking position, no part of the branches 62 is able to interfere with the bore 22, and the head 35 of the connector 30 is freely movable forward or backward within the feed inlet 12. When the head 35 is engaged axially by the maximum amount towards the front, the connector is then in position to be unlocked as can be seen in FIGS. 3A and 3B.

Preferably, the locking means 60 of a device 10 according to the invention consists of a single hairpin spring 60, but in a modified version it has two hairpin springs, each for a respective one of the positions consisting of the locked position and the purge position of the connector 30 in the body 11.

With the connector 30 in its locking position shown in axial cross section in FIG. 3A, the various respective stepped portions of the internal profile of the body 11 and head 35 lie in facing relationship. Thus, the first or rear portion 32 of the connector 30 is facing the first portion 22 of the body 11, the frusto-conical first portion 33 of the connector 30 is facing the frusto-conical portion 23, and finally, the cylindrical second portion 34 of the connector 30 is facing the second portion 24 of the body 11.

The various stepped portions of the connector 30 and body 11 are of course so dimensioned axially that, in the locking position of the connector 30 in the body 11, firstly, the sealing ring 38 of the head 35 is in contact with the cylindrical wall 24 in front of the purge hole 13, so as to establish sealed communication between the feed pipe (not shown) and the feed inlet 12 of the hydraulic member, and secondly, the groove 50 into which the locking portion 64 of the hairpin spring 60 penetrates transversely is in coincidence with the groove 16, and therefore with the hairpin spring 60.

Preferably, the operator is able to exert visual control for correct positioning of the connector 30, that is to say the positioning of the groove 50 in axial coincidence with the transverse groove 16, before proceeding with the locking engagement of the branches 62 of the spring 60 in the groove 50 of the connector.

In order to proceed with locking the connector 30 in the body 11, it is necessary to manoeuvre the locking means 60 from the unlocking position (FIG. 2B) to the locking position (FIG. 3B), that is to say to exert a pushing force in the transverse direction T1 so as to pursue the transverse engagement of the branches 62 in the groove 16.

During this manoeuvre, the applied force causes the fingers 67 of the spring 60 to escape from the notches 19, so that they then pass over the flat 20, which constitutes a cam track, until the fingers 67 position themselves in the run-off zone 21. The hairpin spring 60 is then in its so-called unlocking position.

As shown in the transverse cross sectional view in FIG. 3B, the hairpin spring 60 is in its locking position after being manoeuvred, that is to say the radially inward locking portion 64 of the hairpin spring 60 is engaged in the groove 50 of the head 35 so that the connector 30 is held, axially in both directions, in position in the body 11 in which the fluid is flowing under pressure.

In the locking position, the distance of the run-off zone 21 from the axis X is preferably smaller than the outer diameter of the body 11, so that the fingers 67 are positioned behind the run-off zone 21 with respect to the body 11, which enables the radial size of the device to be reduced, the fingers 67 being then lodged in a space which is delimited radially by the run-off zone 21 and the outer face of the body 11. In addition, in this way any risk of accidental catching of the fingers 67 is avoided.

The device shown in FIGS. 1 to 4 is a device having a purge hole 13, that is to say the body 11 includes a purge orifice 13, with the connector 30 being a connector of the type which is able to occupy a first or locking position (in operation) and a second position, withdrawn axially towards the rear, which is the so-called purge position.

The purge system 13, in particular, permits expulsion from the device 10 of any gas which may have been able to penetrate into it or be trapped inside it, such as air, this being liable to interfere with correct operation of the device.

Figure 3C:
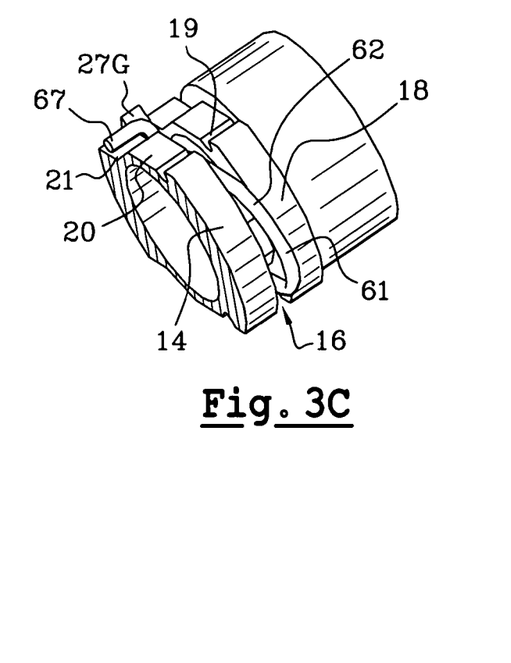
Figure 4A:
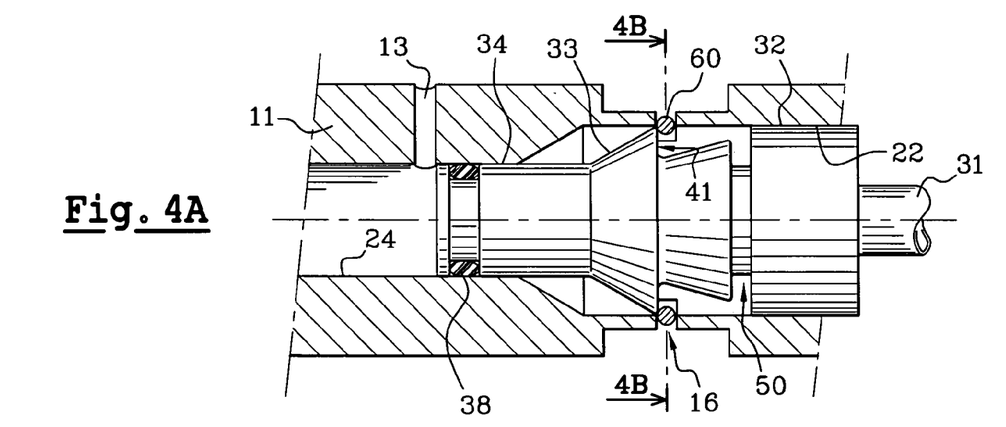
FIGS. 4A, 4B and 4C are respectively a view in axial cross section, a view in transverse cross section, and a perspective view, of a device in the first embodiment of the invention, and they show the device in a second or so-called intermediate purge condition, in which the head of the connector is held by the locking means in an intermediate position in which it is partly retracted towards the rear in the body.
Figure 4B:
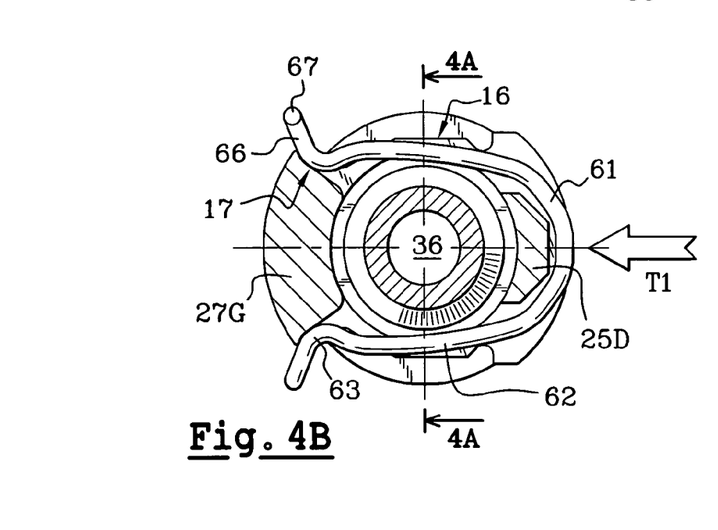
Figure 4C:
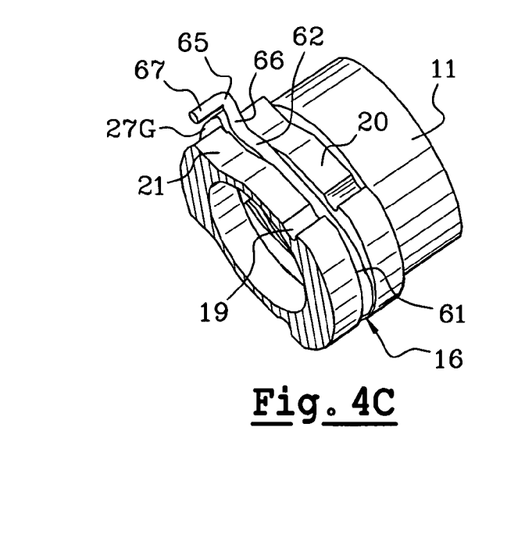

Thus, when the operator wants to change the position of the connector, such as making a partial axial disengagement towards the rear in order to pass from the locking position shown in FIGS. 3A to 3C to the purge position of the device shown in FIGS. 4A to 4C, he exerts a release force on the device, in the transverse direction T1, on the connecting portion 61 of the hairpin spring 60 as shown in FIG. 4B.

The force to be exerted in this example is preferably a pushing force on the hairpin spring 60, which is easy to do for the operator with simple thumb pressure on the portion 61, which is therefore exerted in the same direction as that for the transverse engagement of the hairpin spring in the body, that is to say radially from outside towards the axis.

Under the action of the release force exerted on the connecting portion 61, the control portion 66 in engagement on the ramp 17 is displaced transversely, moving away under the linked action of this pushing force and the form of the ramps 17, by virtue of which an elastic deformation is produced, that is to say an outward opening of the branches 62 of the hairpin spring, in such a way that the first or locking portion 64 is no longer in contact with the connector 30 and the latter can then be freely displaced axially in the body 11 of the feed inlet, in the direction A1 or in the opposite direction.

In the purge position of the connector, the locking of the connector 30 in the body is ensured as before by the spring 60, and more precisely by the locking portions 64 which are positioned in the second groove 40 of the connector and in engagement on the radial rear shoulder 41 once the operator has stopped pushing on the hairpin spring 60.

In this position, as can be seen in FIG. 3A, the sealing ring cooperates with the cylindrical portion 24 behind the purge hole 13, so providing sealing of the rear parts whereby the fluid is unable to escape except through the purge hole 13.

Preferably, the cylindrical portion 24 of the body 11 extends on either side of the purge hole 13, and the head 35 of the connector 30 includes a single sealing ring 38 to ensure sealing in the respective locking and purge positions.

In another version, the connector 30 includes at least one second sealing ring, in particular for providing rear sealing in the purge position, as is known in the prior art.

Preferably, once the operator ceases to exert a releasing force on the portion 61 of the hairpin spring 60, an elastic return force is produced in the opposite direction and the branches 62 of the hairpin tend to revert to their locking position.

Thus, there is no danger that the operator is able to omit to replace the spring 60 in its locking position, especially when he effects the change from the locking position to the purge position, because the hairpin spring will automatically reposition itself in the locking position.

The fingers 67 of the hairpin spring 60 in this example extend in opposite directions, that is to say towards the front and the rear of the body 11 respectively, which leads to better balancing of the hairpin spring 60.

In addition, since the notches 19 and run-off zone 21 are symmetrical, the hairpin spring 60 is perfectly reversible and may be fitted on the body 11 without the operator having to be concerned about a particular direction.

When the operator has purged the device 10, it is necessary to replace the connector in its locking position which corresponds to its working position.

To this end, it is not necessary for the operator to act on the spring 60. In this connection, under the action of an axial force exerted in the forward direction on the connector 30, the first frusto-conical portion 36 acts as a ramp through its inclined rear face, which tends to cause the branches 62 of the spring 60 to move radially apart, whereby to enable the connector 30 to pass into its axially engaged position, that is to say the locking position.

Because of the portion 37, the locking portions of the hairpin spring 60 are moved from the groove 40 into the groove 50, into which they automatically fall by simple spring return action.

Preferably, the operator does not have to manipulate the hairpin spring 60, but he does have simply to exert an axial forward force on the connector 30.

Figure 5:
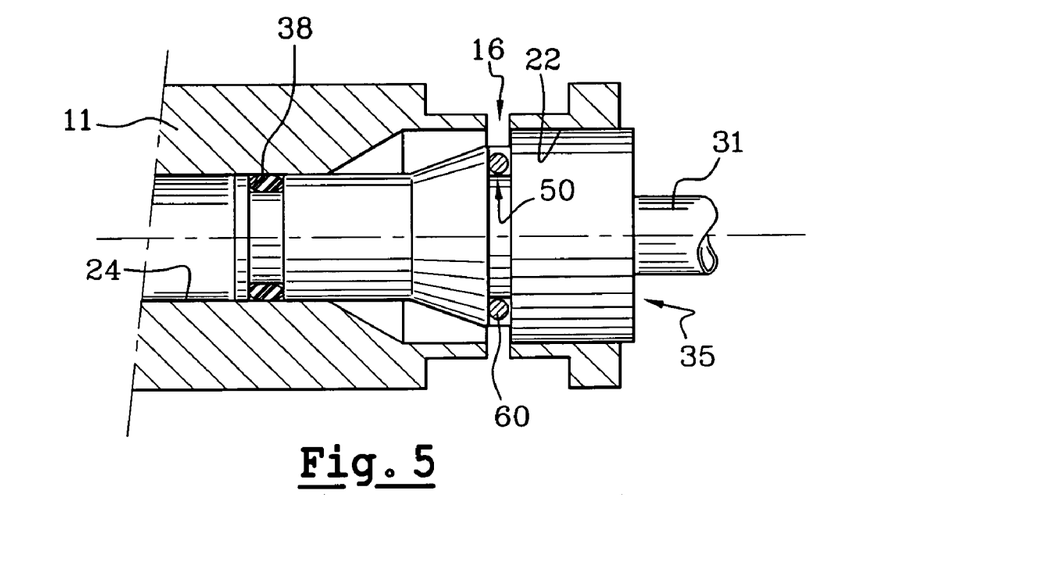
FIG. 5 is a view in axial cross section similar to those in FIGS. 3A and 4A, but shows a modified version of a device according to the invention in its working position, in which the body does not have a purge orifice and the head of the connector is simplified.

FIG. 5 shows a modified embodiment of the invention.

More precisely, the device 10 is a simple device with a single locking position in which the body 11 does not have a purge system 13, and the head 35 of the connector 30 is simplified in that it only has one groove 50.

The operation of such a device is identical to that described above, in particular for FIGS. 3A to 3C, which show a connector in the locking position.

Preferably, the locking means are identical for a device with or without a purge facility, which enables standardisation to be achieved, by virtue of which, in particular, it is possible to reduce production costs of the locking means.

FIGS. 6 to 9 illustrate a second embodiment of the invention, in which the locking means 60 are similar to those in the first embodiment and consist of a generally U-shaped hairpin member having two branches 62 which are generally parallel and rectilinear, and which are connected together through a connecting portion 61.

The locking means 60 may of course be made in different ways, and accordingly the means may consist of a hairpin 60 of toroidal or square or rectangular cross section, made of metal or a synthetic material, and being able to be made in any way.

In the second embodiment, the hairpin 60, which in this case is of rectangular cross section, is for example made by moulding in a synthetic material, and is simplified as compared with that in the first embodiment in that, firstly, it does not have the first and second bends, while secondly, the fingers 67 do not extend axially with respect to the branches 62, but they lie in the same median transverse plane PTM.

This type of hairpin member 60 has the advantage that it enables the body 11 to be simplified, and in particular the sleeves 14, comprising a cam track and specific notches for cooperation with the fingers 67, can be omitted, the cam track and the said notch being formed in the groove 16 and more particularly on the portions 27G and 25D for cooperation with the fingers 67, which in this example are in the median transverse plane of the groove 16.

Figure 6:
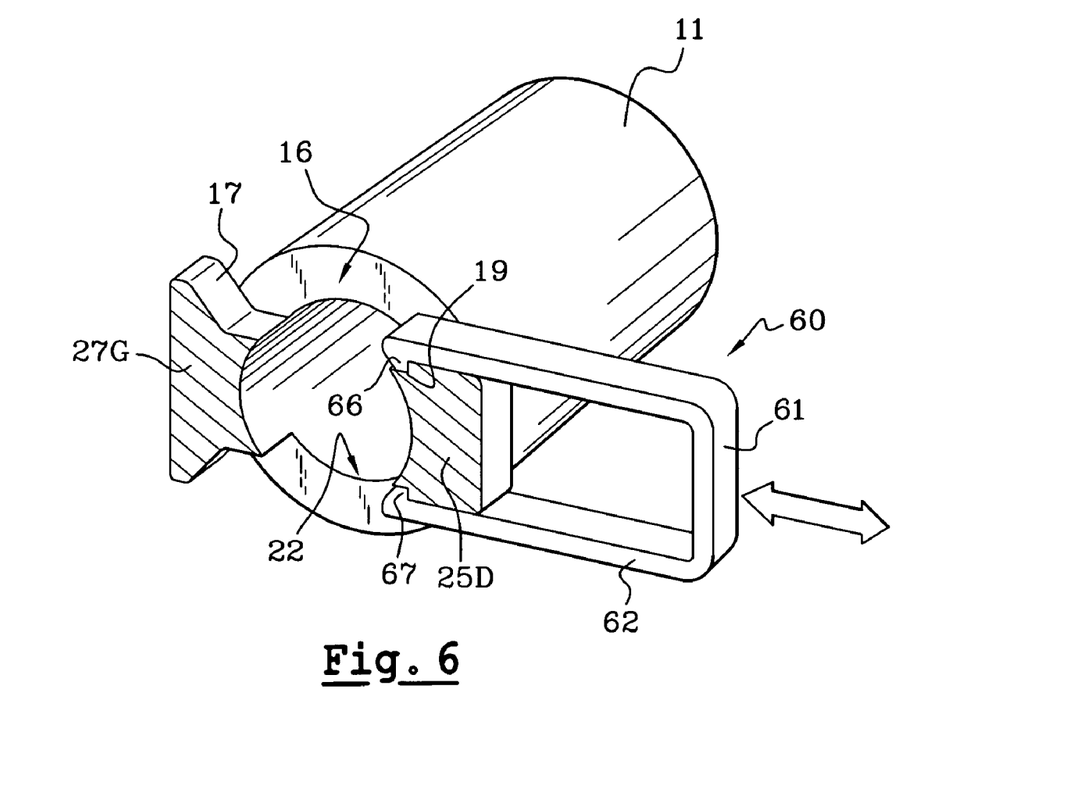
FIGS. 6 and 7 are respectively a perspective view similar to FIG. 2C and a view in transverse cross section similar to FIG. 2B, and show a second embodiment of a device having features of the invention.
Figure 7:
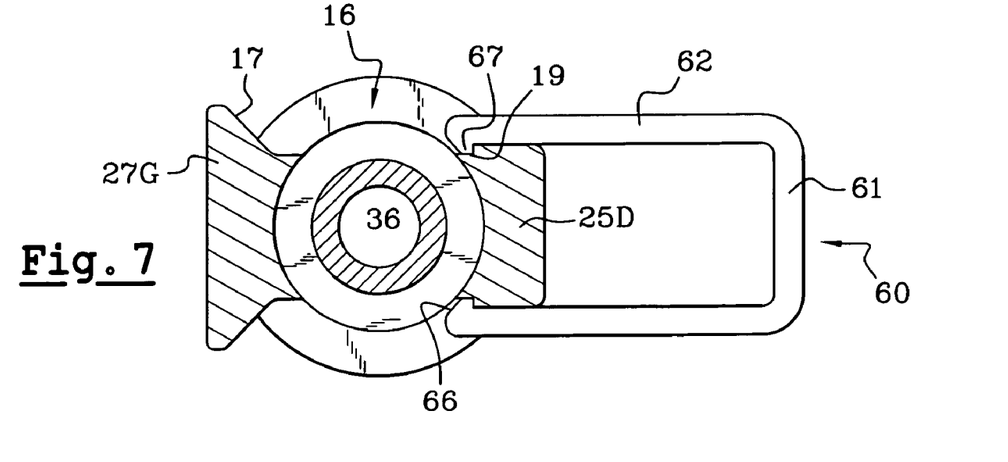

FIGS. 6 and 7 show, in a manner similar to that in FIGS. 2B and 2C, a hairpin member mounted on the body 11 in a position which is the so-called unlocking position. In this position the hairpin 60 is preferably retained by its fingers 67 oriented radially inwards, which cooperate with the notches 19 so that the hairpin 60 is impossible to lose.

Figure 8:
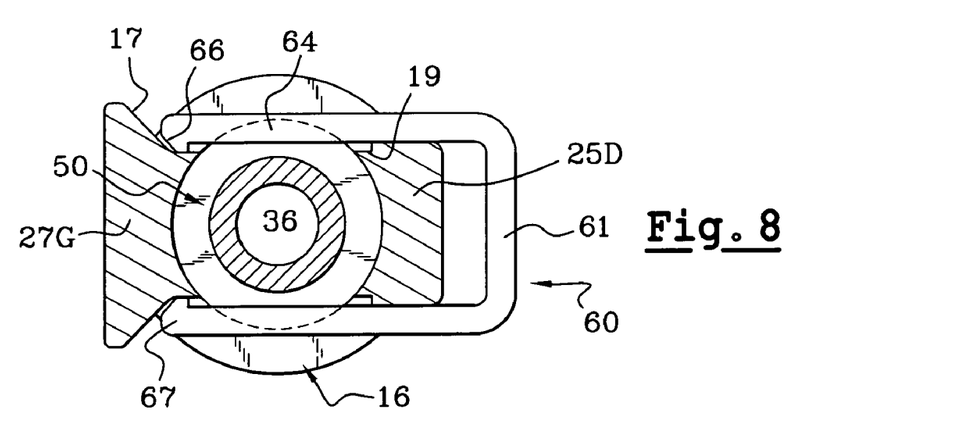
FIG. 8 is a view in transverse cross section similar to FIG. 3C, showing a device in the second embodiment of the invention in its locking position.

FIG. 8 shows the hairpin 60 in a locking position in a similar way to FIG. 3B.

In order to shift the hairpin 60 from its unlocked position of FIGS. 6 and 7 to its locked position shown in FIG. 8, it is necessary to engage the hairpin 60 transversely in the groove 16 of the body 11, in the direction T1 as was explained above.

The locking portions 64 of the hairpin 60 extend transversely into the groove 50 to lock the connector 30 in its axially forwardly engaged position.

Figure 9:
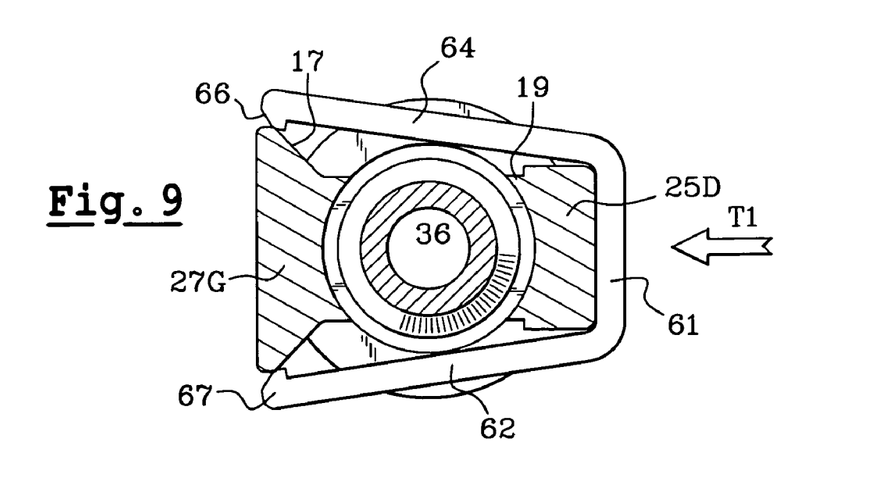
FIG. 9 is a view in transverse cross section similar to FIG. 4C, showing a device in the second embodiment of the invention in its unlocked position when a release force is exerted on the locking means.

FIG. 9 is a Figure similar to FIG. 4B, and shows the hairpin 60 when a release force is applied on the connecting portion 61 in the direction T1, in particular to enable the connector 30 to pass from its working position to its intermediate purge position, the deformation of the branches being obtained by cooperation of the chamfered free ends 66 of the branches 62 with the ramps 17. The chamfered ends 66 also enable the hairpin 60 to be mounted on the body 11.

What is claimed is:

1. A device (10) for connecting a feed for a pressure fluid system comprising: a connector (30) having a head (35) received axially in a body (11) of a feed inlet (12) including a purge orifice (13), wherein the connector (30) is capable of being locked in a forward position engaged axially in the feed inlet body (11) by locking means (60), which includes a generally symmetrical U-shaped hairpin (60) having two transverse locking branches (62), the connector (30) and body (11) being unlocked from each other, in order to enable the connector (30) to be at least partly moved in a rearward direction axially out of the body (11), by elastic deformation of the locking means (60) which results from the mating cooperation that exists between at least part (66) of the transverse locking branches (62) and at least part (17) of the body (11) under the action of a releasing force exerted on the locking means (60) being in a locking position, in a transverse direction (T1), and wherein at least one sealing ring (38) is arranged between the head (35) of the connector (30) and the feed inlet (12), wherein in the engaged position, the connector (30) sealingly obturates the purge orifice (13), the engaged position can be disengaged by acting on the connecting portion (61) of the hairpin (60), wherein, by pushing on a connecting portion (61) which connects the two transverse locking branches (62) of the hairpin (60) together, the connector (30) is able to occupy a purge position in which it is partly retracted axially towards the rear, wherein the feed inlet (12) is put into sealed communication with the purge orifice (13), and the purge position being maintained by the locking branches which are positioned in a groove (40) of the connector and in engagement on a radial rear shoulder (41), and wherein, by pulling on the connecting portion which connects the two transverse locking branches (62) of the hairpin (60), the connector (30) is adapted to be disengaged completely from the feed inlet, the locking means occupying an unlocking position.

2. A device according to claim 1, wherein the locking means (60) comprise two generally transversely oriented locking branches (62) orthogonal to an axis (X), wherein at least one locking portion (64) of a locking branch is received at least partly in a groove (30, 40) of the head (35) of the connector (30).

3. A device according to claim 2, wherein the elastic deformation of the locking means (60) causes the locking portion (64) of the branch (62) to be displaced outwards in a direction substantially at right angles to the axis (X).

4. A device according to claim 2, wherein, when pushing on the connecting portion, the elastic deformation is obtained by mating cooperation between a control portion (66) of the branch (62) and a main control ramp (17) of the body (11).

5. A device according to claim 4, wherein the tubular portion of the body (11) has at least one generally transversely oriented groove (16) which receives the locking branch (62).

6. A device according to claim 2, wherein each locking branch (62) has at its free end at least one finger (67) which co-operates with means (19, 21) for maintaining it in position on the body (11).

7. A device according to claim 6, wherein said finger (67) of the branch (62) co-operates with a notch (19) of the body (11) which determines a position of the locking means (60) referred to as the unlocking position.

8. A device according to claim 6, wherein said finger (67) of the branch (62) co-operates with a run-off zone (21) of the body (11) which determines a position of the locking means (60) referred to as the locking position.

9. A device according to claim 8, wherein the finger (67) of the branch (62) cooperates with a notch (19) of the body (11) which determines a position of the locking means (60) referred to as the unlocking position; and the notch (19) and run-off zone (21) are arranged in succession in the direction and the sense of application of the releasing force (T1).

10. A device according to claim 1, wherein, once pushing on the connecting portion ceased, the elastic deformation exerts an elastic return force on the locking means, the transverse branches tending to revert to the locking position.

11. A device according to claim 1, wherein the connector is capable of being moved from the purge position to the engaged position without any realising force exerted on the locking means.

* * * * *